United States Patent
Ma et al.

(10) Patent No.: US 8,239,065 B2
(45) Date of Patent: Aug. 7, 2012

(54) AIR CONDITIONER WITH OPERATION ACCORDING TO A USER-DEFINED CURVE AND THE CONTROL, METHOD THEREOF

(75) Inventors: Yingjiang Ma, Guangdong (CN); Youlin Zhang, Guangdong (CN); Bo Liang, Guangdong (CN); Xuetao Mi, Guangdong (CN); Xuan Cao, Guangdong (CN)

(73) Assignee: Gree Electric Applicance, Inc. of Zhuhai, Zhuhai, Guangdong (CN)

( * ) Notice: Subject to any disclaimer, the term of this patent is extended or adjusted under 35 U.S.C. 154(b) by 178 days.

(21) Appl. No.: 12/451,083

(22) PCT Filed: Apr. 28, 2008

(86) PCT No.: PCT/CN2008/000858
§ 371 (c)(1),
(2), (4) Date: Oct. 26, 2009

(87) PCT Pub. No.: WO2008/134931
PCT Pub. Date: Nov. 13, 2008

(65) Prior Publication Data
US 2010/0121494 A1    May 13, 2010

(30) Foreign Application Priority Data
Apr. 28, 2007   (CN) .......................... 2007 1 0097263

(51) Int. Cl.
*G05B 13/00*     (2006.01)
*G05B 11/01*     (2006.01)

(52) U.S. Cl. ............. 700/276; 700/15; 700/16; 715/965

(58) Field of Classification Search .............. 700/14–16, 700/276–278, 300; 715/965
See application file for complete search history.

(56) References Cited

U.S. PATENT DOCUMENTS
2004/0133314 A1*   7/2004   Ehlers et al. .................. 700/276
2004/0182941 A1*   9/2004   Alles ............................ 236/49.3

FOREIGN PATENT DOCUMENTS
| CN | 1469085 A   | 1/2004  |
| CN | 2663859 Y   | 12/2004 |
| CN | 1699864 A   | 11/2005 |
| CN | 101033882 A | 9/2007  |
| JP | 2000146271  | 5/2000  |

OTHER PUBLICATIONS
ISR for WO 2008/134931, Jul. 17, 2008.

* cited by examiner

*Primary Examiner* — Sean Shechtman
(74) *Attorney, Agent, or Firm* — Lau & Associates, LLC.

(57) ABSTRACT

An air conditioner with operation according to a user-defined curve and the control method thereof are disclosed. The air conditioner includes a main unit, the main unit includes: a receiving unit of user-defined curve for receiving the user-defined curve set by a user, the user-defined curve is used to define the coincidence relation between the needed air conditioning temperature and the time, and a control unit connected to the receiving unit of user-defined curve for controlling the air conditioning temperature of the air conditioner at different time according to the user-defined curve. The user-defined curve can be set by a keyboard of a remote controller by the user, the data of the user-defined curve can be stored in a memory chip and then can be sent into an infrared signal receiving unit of the main unit, a MCU control chip controls the operation of the air conditioner according to the user-defined curve.

16 Claims, 3 Drawing Sheets

AIR CONDITIONER WITH OPERATION ACCORDING TO A USER-DEFINED CURVE AND THE CONTROL, METHOD THEREOF

The Applicant incorporates herein by reference priority document CN200710097263.9 filed to the State Intellectual Property Office of the People's Republic of China on Apr. 28, 2007 and also incorporates herein by reference international patent application No. PCT/CN2008/000858 filed to the World Intellectual Property Organization on Apr. 28, 2008.

FIELD OF THE INVENTION

The invention relates to an air conditioner and a control method thereof, in particular to an air conditioner that operates according to a user-defined curve and a control method thereof. A user can realize user-defined curve setting by a remote controller according to personal preferences and ambient environment.

TECHNICAL BACKGROUND

With the improvement of people's living standard, more comfortable air conditioners are needed. The relationship between room temperature variation and sleep quality differs because of age, sex, personal preferences, etc. Generally speaking, body temperature constantly changes during sleep; the body temperature in the first few hours of sleep is the normal body temperature, decreases with the deepening of sleep, and slowly increases before awakening along with self-regulation of the biological clock.

In order to prevent body temperature from going down because the room temperature is too low during sleep, more considerations should be given to air conditioner operation. The sleep mode of an air conditioner refers to an operating mode of the air conditioner when the user is in sleep, and air conditioner manufacturers can only obtain general data for defining the sleep mode of the air conditioner by comprehensive statistics. For example, FIG. 1 is a temperature-time curve of the common sleep mode of an air conditioner of the prior art. As shown in FIG. 1, the set temperature automatically rises by 0.5 degree half an hour after starting the sleep mode under a cooling mode, rises by 1 degree after 1 hour and is 2 degrees higher than the originally set temperature after 2 hours, and then the temperature keeps stable until the sleep mode is cancelled. For another example, the set temperature automatically decreases by 0.5 degree half an hour after starting the sleep mode under a heating mode, decreases by 1 degree after 1 hour and is 2 degrees lower than the originally set temperature after 2 hours, and then the temperature keeps stable until the sleep mode is cancelled.

Generally, a user cannot alter such a sleep mode. The sleep mode can only meet the need of some people, not all people, which makes the sleep mode only an auxiliary function of the air conditioner, and therefore a lot of people do not use this function at all. In addition, the air conditioner only serves as a cold source (or heat source) under the sleep mode, and is far from making human bodies feel comfortable.

SUMMARY OF THE INVENTION

The invention aims at designing an air conditioner with operation according to a user-defined curve and a control method thereof, thus enabling the air conditioner user to adjust the temperature curve based on personal sleep habit, and making the sleep mode meet the requirements of a vast majority of people. Particularly, a user can define a curve via a remote controller at any time to create a comfortable sleep environment according to personal preferences and geographical environment.

Therefore, the first purpose of the present invention is to provide an air conditioner with operation according to a user-defined curve. The air conditioner comprises a main unit, which comprises a user-defined curve receiving unit that receives user-defined curve data set by the user, the user-defined curve determines the corresponding relationship between the temperature and the time required by the user; and a control unit which is connected with the user-defined curve receiving unit and controls the temperature of the air conditioner at different times according to the user-defined curve.

Preferably, the control unit is an MCU control chip of the air conditioner, the user-defined curve data is stored in a RAM of the MCU control chip of the air conditioner, and the control unit automatically calls the user-defined curve data according to user settings.

Preferably, the air conditioner comprises a remote controller by which the user sets a user-defined curve. The remote controller comprises a keypad which is used for inputting temperature data and time data of the user-defined curve; a master chip of the remote controller which receives the temperature data and the time data input by the user, generates user-defined curve data and respectively transmits the user-defined curve data to a memory chip, a display unit and an emission unit; the memory chip which is used for storing the user-defined curve data; the display unit which displays data input by the user and displays the user-defined curve according to the user-defined curve data transmitted by the master chip of the remote controller; and the emission unit which transmits the user-defined curve data sent by the master chip of the remote controller to a user-defined curve receiving unit of the main unit.

The second purpose of the present invention is to provide a method for controlling an air conditioner to operate according to a user-defined curve. The method comprises the following steps: setting a user-defined curve via the keypad of a remote controller; storing, by the remote controller, the set user-defined curve data in a memory chip of the remote controller; transmitting, via an infrared signal emission unit of the remote controller, the user-defined curve data to an infrared signal receiving unit of a main unit of the air conditioner in a coded format; storing, by the infrared signal receiving unit of the main unit of the air conditioner, the user-defined curve data in a RAM of an MCU control chip of the main unit of the air conditioner; and then setting, by the MCU control chip, the preset operating parameters in a corresponding time period according to the user-defined curve data in the RAM, and controlling the main unit of the air conditioner to operate based on the operating parameters.

Optionally, the user-defined curve is a user-defined sleep curve. For a remote controller with a time interval setting function, the steps of setting the user-defined sleep curve further comprise: user entering into the user-self-defining setting state; setting a temperature value, remote controller automatically increasing a certain time interval and automatically keeping the set temperature; user directly making confirmation if there is no need to change the set temperature, and then remote controller automatically increasing a certain time interval again; user adjusting the set temperature to the desired value if he needs to change the set temperature, and then remote controller automatically increasing a certain time interval; repeating the steps until temperature setting for the entire sleep time is completed, thus completing a user-defined sleep curve.

Optionally, the user-defined curve is a user-defined time-temperature curve. For a remote controller with a time timing function, the steps of setting the user-defined time-temperature curve further comprise: user entering into the user-defined temperature setting mode to activate the user-defined curve setting state; setting the starting time and operating time period of entering into the user-defined curve operating state; setting the temperature corresponding to the set operating time period to complete the setting of a temperature point; and completing the setting of the user-defined time-temperature curve by repeatedly setting multiple temperature points.

The present invention is not limited to the setting of the said sleep mode, and the user-defined curve can also be a user-defined mode curve. For a remote controller with a clock counting function, the steps of setting the user-defined mode curve further comprise: entering into the user-defined setting state to set the starting time and the operating time period of the user-defined mode; setting the air-conditioner's operating functional parameters corresponding to each operating time period, the said functional parameters including On/Off, Mode, Temperature and/or Wind Velocity.

According to the present invention, air conditioner users can easily and flexibly set time-temperature curves according to personal sleep habit to make air conditioning more comfortable during sleep, which is really a technical breakthrough.

DETAILED DESCRIPTION OF THE PREFERRED EMBODIMENT

The embodiments of the present invention are more specifically described by referring to the attached drawings.

Figure 1:
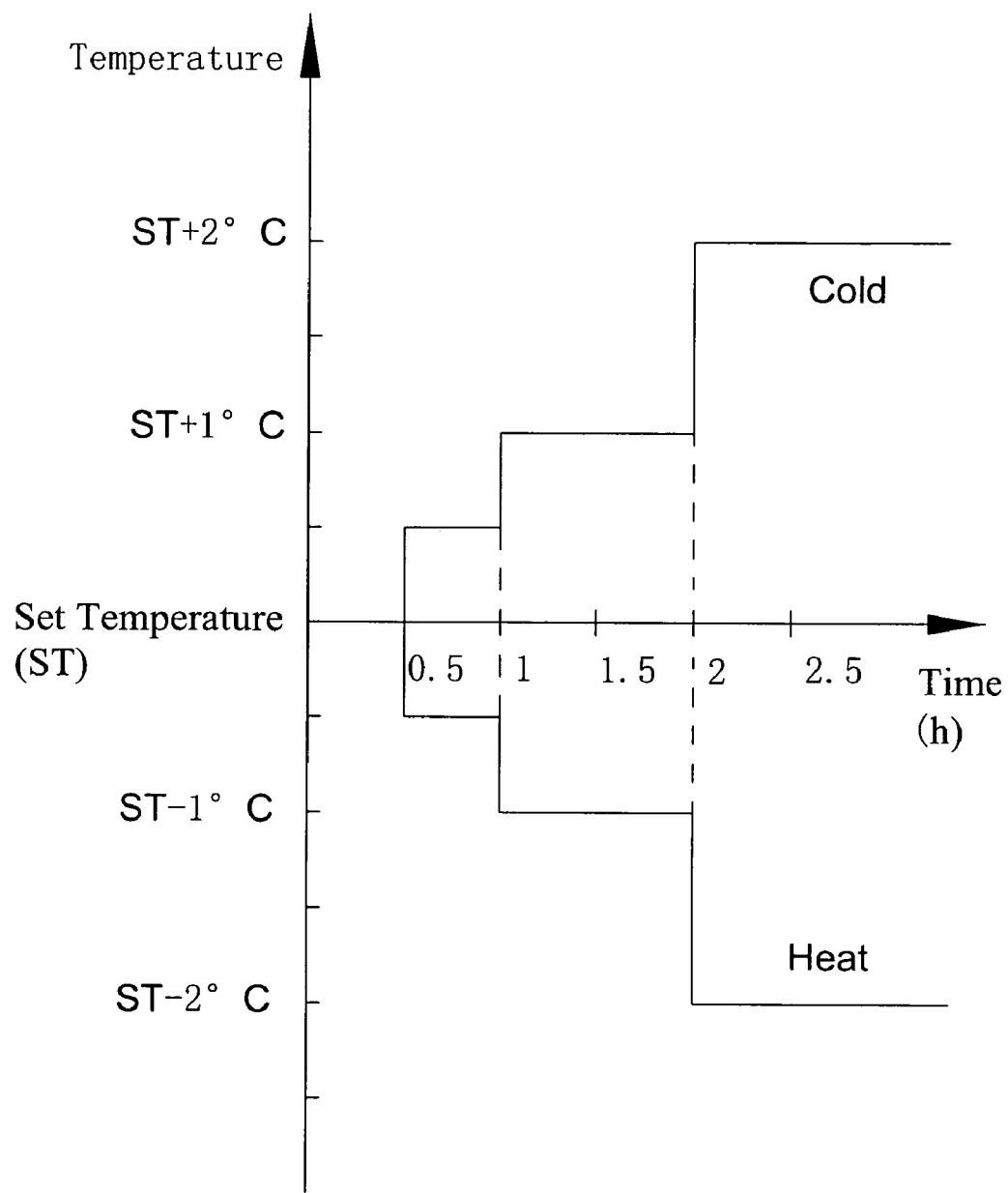
FIG. 1 is a temperature-time curve of the common sleep mode of an air conditioner of the prior art.
Figure 2:
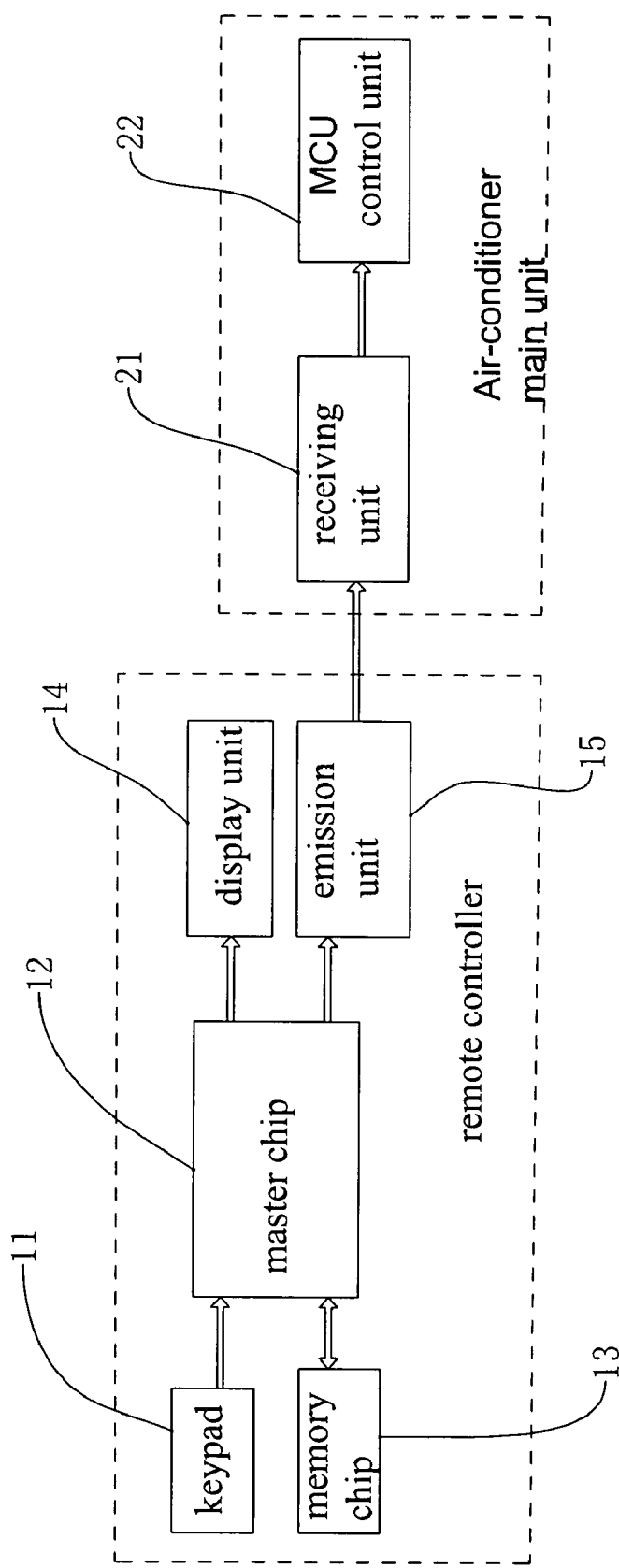
FIG. 2 is a module block diagram of the air conditioner with a user-defined curve function of the present invention.

FIG. 2 is a module block diagram of the air conditioner with a user-defined curve function of the present invention. The air conditioner comprises a main unit 2 and a remote controller 1.

The main unit 2 comprises a user-defined curve receiving unit 21 which receives user-defined curve data set by the user, the user-defined curve determines the corresponding relationship between the temperature and the time required by the user; and a control unit 22 which is connected with the user-defined curve receiving unit 21 and controls the temperature of the air conditioner at different times according to the user-defined curve.

The user sets the user-defined curve via the remote controller 1. The remote controller 1 comprises a keypad 11 which is used for inputting temperature data and time data of the user-defined curve; a master chip 12 of the remote controller which receives the temperature data and the time data input by the user, generates user-defined curve data and respectively transmits the user-defined curve data to a memory chip 13, a display unit 14 and an emission unit 15; the memory chip 13 which stores the user-defined curve data; the display unit 14 which displays the data input by the user and displays the user-defined curve according to the user-defined curve data transmitted by the master chip 12 of the remote controller; and the emission unit 15 which transmits the user-defined curve data sent by the master chip 12 of the remote controller to the user-defined curve receiving unit 21 of the main unit 2.

The control unit 22 of the main unit is an MCU control chip of the air conditioner, the user-defined curve data are stored in a RAM of the MCU control chip of the air conditioner, and the control unit 22 automatically calls the user-defined curve data according to user settings.

The main unit 2 of the air conditioner can also be connected with a computer, the user can set the user-defined curve on the computer, and then the computer transmits the user-defined curve data to the user-defined curve receiving unit 21 of the main unit 2 of the air conditioner to make the air conditioner operate according to the set user-defined curve.

The First Embodiment

A Sectional Timing Remote Controller Sets a User-Defined Sleep Curve

Under the user-defined mode, the user can alter the set temperature corresponding to sleep temperature curve until reaching the maximum default sleep time of the remote controller; however, time intervals are non-adjustable. The preferred embodiment is as follows:

Press the "Sleep" key on the remote controller of the air conditioner to sequentially enter into the modes of "normal sleep", "intelligent sleep", "user-defined sleep" and "cancel sleep". The existing sleep mode of the remote controller is operated when "normal sleep" is selected; sleep curve pre-stored in the remote controller is operated when "intelligent sleep" is selected; and user-defined sleep temperature curve operation is operated when "user-defined sleep" is selected.

Under the normal sleep mode, the main unit of the air conditioner operates just in the previous common sleep mode, which does not change the sleep habit of the users who are already used to this mode.

Under the intelligent sleep mode, the sleep curve that most people are accustomed to is memorized in the control system by sampling survey, and the user can select the sleep curve for his sleep.

Under the user-defined sleep mode, the user-defined sleep curve is directly called for operation. The remote controller enters into the user-defined setting state if a "Set" key is consecutively pressed for three times within two seconds; then the timed time on the remote controller displays "1 hour later" and the temperature corresponding to the sleep curve set last time is displayed at the place of "88" for setting temperature and flickers.

Figure 3:
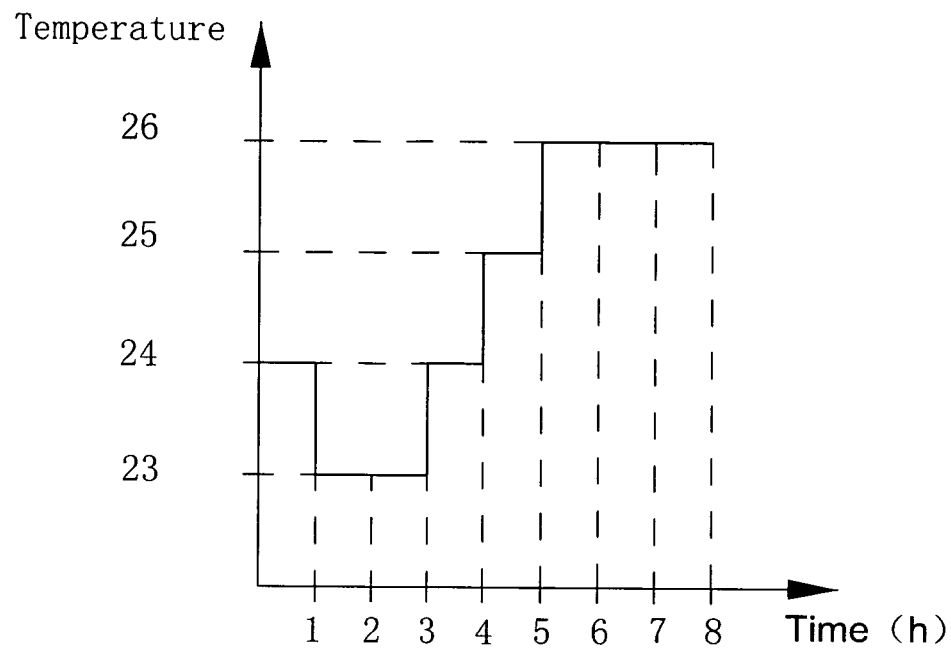
FIG. 3 is a user-defined sleep curve of the first embodiment of method for controlling the air conditioner to operate according to a user-defined curve of the present invention, where air conditioner users can optionally alter the user-defined sleep curve, the longitudinal axis is the set temperature, the horizontal axis is time, and 1 hour is automatically added after each change of time.

Firstly, the "+" key and the "−" key are used to change the set temperature (for example, the temperature is set at 23 degrees in FIG. 3) and then an "Enter" key is pressed for confirmation; the "Enter" key is directly pressed if no change is required for the temperature.

At the moment, 1 hour is automatically added to the timed time of the remote controller and '2 hours later' is displayed.

The temperature corresponding to the sleep curve set last time is displayed at the place of "88" for setting temperature and flickers.

The above two steps are repeated until temperature setting of '8 hours later' is completed, thus completing the setting of a user-defined sleep curve. At the moment, the remote controller display returns to the original set time and the originally set temperature and displays a user-defined sleep curve pattern at the same time.

In the said state-setting process, if no key is pressed within 5 seconds, the remote controller will automatically quit the sleep curve setting state and return to the original display state. And the sleep curve setting state can also be quitted if the "On/Off" key, the "Mode" key or the "Sleep" key is pressed to change the sleep mode in the setting process.

The user can check the set sleep curve in the same way as he sets the sleep curve. Under the user-defined sleep mode, he can check the user-defined sleep curve by directly pressing the "Set" key.

The set sleep curve is memorized in the remote controller so that the remote controller can be used for multiple air conditioners. The remote controller directly transmits the set temperature curve to the air conditioner after entering into the user-defined sleep mode.

The realization of user-defined sleep curve functions is shown in FIG. 2: firstly, the user sets the user-defined sleep curve via the keypad 11, the display unit 14 of the remote controller synchronously displays corresponding patterns and data at the time of setting, the remote controller 1 stores the set user-defined curve data in a memory chip 13 after the setting, the memory chip 13 can be an AT24C02A or a memory chip of another type with similar functions, the infrared signal emission unit 15 of the remote controller transmits the user-defined curve data to the infrared signal receiving unit 21 of the air conditioner in a coded format, then the infrared signal receiving unit 21 stores the user-defined sleep curve data in the RAM of the MCU control chip 22 of the air conditioner, then the MCU control chip 22 sets the preset temperature in a corresponding time period according to the user-defined sleep curve in the RAM, and controls the air conditioner to operate based on judging the differences between the set temperature and indoor ambient temperature. When the setting of the user-defined sleep curve is completed, the user can directly call the user-defined sleep curve data in the memory chip 13 and transmit the data to the main unit 2 of the air conditioner by the infrared signal emission unit 15 if the user does not desire to change the setting of the user-defined sleep curve again, the main unit 2 of the air conditioner can operate according to the temperature set by the user-defined sleep curve in corresponding time after receiving the user-defined sleep curve set by the remote controller 1.

The Second Embodiment

A Time Timing Controller Sets a User-Defined Time-Temperature Curve

The setting of the user-defined curve of the remote controller is not limited to functional setting of the first embodiment. Under a user-defined sleep curve mode, a user can optionally set a time-temperature curve and call or modify the curve at any time according to personal preferences. The preferred embodiment is as follows:

Under the user-defined curve mode, the remote controller enters into the user-defined setting state if a "Set" key is consecutively pressed for 3 times within two seconds, then the timed time displayed on the remote controller is the time corresponding to the curve set last time and flickers.

Figure 4:
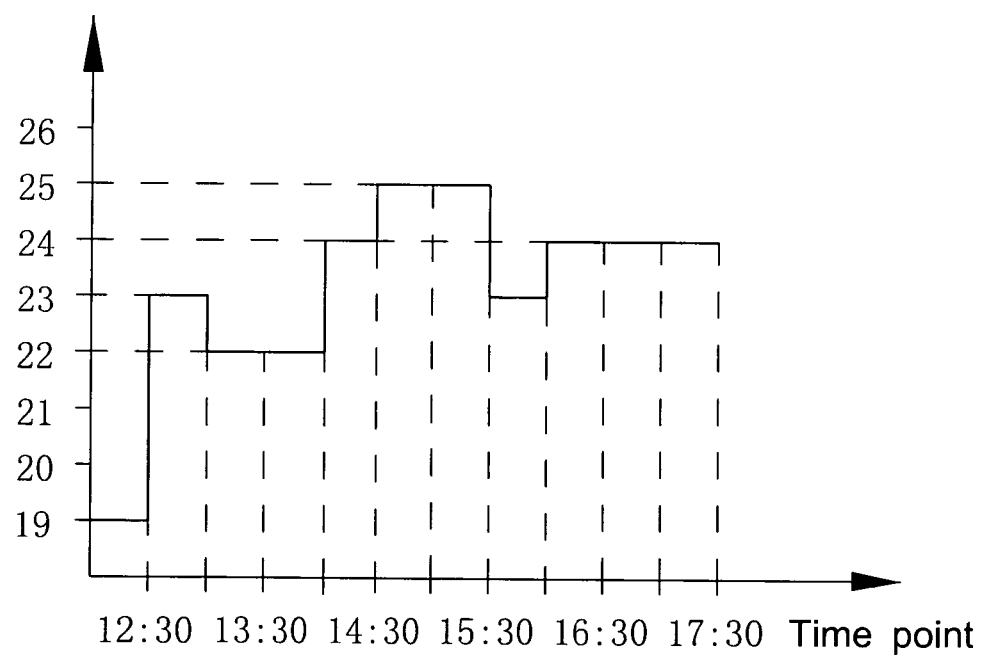
FIG. 4 is a user-defined time-temperature curve of the second embodiment of the method for controlling the air conditioner to operate according to the user-defined curve of the present invention, where an air conditioner user can optionally alter the time-temperature curve, the longitudinal axis is the set temperature and the time of the horizontal axis can be optionally set.

Firstly, the "+" key and the "−" key are used, in combination with a "Timing" key, to change the corresponding set time (for example, 12:30 in FIG. 4) and operating time period (for example, half an hour (12:30-13:00) in FIG. 4), the time can be any time of 24 hours, then an "Enter" key is pressed for confirmation.

At the moment, temperature corresponding to the curve set last time is displayed at the place of '88' for setting temperature on the remote controller and flickers, the "+" key and the "−" key can be used to change the corresponding set temperature, then the "Enter" key is pressed for confirmation.

At the moment, the timed time displayed on the remote controller is the time corresponding to the curve set last time and flickers.

The above two steps are repeated until time and temperature setting is to the satisfaction of the user and the time-temperature curve setting is completed by pressing the "Set" key. At the moment, the remote controller returns to the display of the original timed time and the original set temperature and displays a user-defined set curve pattern at the same time.

In the said state-setting process, if no key is pressed within 5 seconds, the remote controller automatically quits the user-defined curve setting state and returns to the original display state. And the remote controller also quits the user-defined curve setting state if the "On/Off" key is pressed in the setting process.

The user can check or modify the set curve in the same way as he sets the user-defined curve, and start to check the curve by directly pressing the "Set" key under the user-defined curve mode. A group of data is displayed at a time display zone or a temperature display zone and flickers when the "Set" key is pressed each time. If the user is dissatisfied with any one of the time or temperature, he can use the "+" key and the "−" key, and/or in combination with the "Timing" key, for modification and press the "Enter" key for confirmation, then the data is stored.

The remote controller transmits the set time and the corresponding set temperature data curve to the air conditioner after entering into the user-defined curve mode each time, and the set user-defined curve is memorized in the remote controller so that the remote controller can be used for multiple air conditioners.

The realization of the user-defined time-temperature curve functions is shown in FIG. 2: firstly, the user sets the user-defined curve via the keypad 11, the display unit 14 of the remote controller synchronously displays corresponding patterns and data at the time of setting, the remote controller 1 stores the set user-defined time-temperature curve data in the memory chip 13 after the setting, the memory chip 13 can be an AT24C02A or a memory chip of another type with similar functions, the infrared signal emission unit 15 of the remote controller transmits the user-defined time-temperature curve data to the infrared signal receiving unit 21 of the air conditioner in a certain coded format, then the infrared signal receiving unit 21 stores the user-defined curve data in the RAM of the MCU control chip 22 of the air conditioner, then the MCU control chip 22 sets the preset temperature in a corresponding time period according to the user-defined curve in the RAM, and controls the air conditioner to operate correspondingly by judging the differences between the set temperature and indoor ambient temperature. When the setting of the user-defined curve is completed, the user can directly call the user-defined curve data in the memory chip 13 and transmit the data to the main unit 2 of the air conditioner by the infrared signal emission unit 15 if the user does not desire to change the setting of the user-defined curve again, the main unit 2 of the air conditioner can operate according to the temperature set by the user-defined curve in corresponding time after receiving the user-defined time-temperature curve set by the remote controller 1.

The Third Embodiment

A Time Timing Remote Controller Sets a User-Defined Operating Mode

The present invention is not limited to the above functional setting. Under the user-defined mode, a user can set optional change instructions (including setting of start-up and shut-down, change of operational mode, setting of temperature or wind velocity of an indoor unit, etc.) within 24 hours of a day. The preferred embodiment is as follows:

Under the user-defined mode, the remote controller enters into the user-defined setting state if a "Set" key is consecutively pressed for three times within two seconds, then the remote controller displays a parameter value set last time and flickers.

Firstly, the "+" key and the "−" key can be used, in combination with a "Timing" key, to change corresponding starting time and operating time period, the time can be any time of 24 hours, then an "Enter" key is pressed for confirmation.

At the moment, corresponding display zone of On/Off, Mode, Temperature and Wind Velocity on the remote controller sequentially flicker. The user can press the "Enter" key for confirmation to skip. The user can also press the corresponding key to adjust the functions and then press the "Enter" key for confirmation after completing the adjustment.

The above two steps are repeated until the user completes the setting of 24 hours and the setting of a function table is completed by pressing the "Enter" key. At the moment, the remote controller display returns to the original set time and the originally set temperature and the air conditioner enters into an automatic setting operating state.

The remote controller automatically quits the user-defined setting state and returns to the original display state if no key is pressed within 5 seconds in the state-setting process. The user-defined setting state can also be quitted if the "On/Off" key is pressed in the setting process.

The user can check or modify parameters in the user-defined setting mode, and start to check by directly pressing the "Set" key under the user-defined setting mode. A group of parameters of the set time are displayed and flicker when the "Set" key is pressed each time. The user can directly press the "Enter" key to skip if no modification is needed, he can also modify the functions via corresponding functional keys and press the "Enter" key for confirmation, then the data is stored.

The realization of user-defined mode function is shown in FIG. 2: firstly, the user sets a user-defined operating parameter curve via the keypad 11, the display unit 14 of the remote controller synchronously displays patterns and data corresponding to each parameter at the time of setting, the remote controller 1 stores the set user-defined operating parameter curve data in the memory chip 13 after the setting, the memory chip 13 can be an AT24C02A or a memory chip of another type with similar functions, the infrared signal emission unit 15 of the remote controller transmits the user-defined operating parameter curve data to the infrared signal receiving unit 21 of the air conditioner in a coded format, then the infrared signal receiving unit 21 stores the user-defined operating parameter curve data in the RAM of the MCU control chip 22 of the air conditioner, then the MCU control chip 22 sets the preset operating parameters in a corresponding time period according to the user-defined operating parameter curve in the RAM and controls the air conditioner to operate based on the operating parameters. When the setting of the user-defined operating parameter curve is completed, the user can directly call the user-defined operating parameter curve data in the memory chip 13 and transmit the data to the main unit 2 of the air conditioner by the infrared signal emission unit 15 if the user does not desire to change the setting of the user-defined operating parameter curve again, the main unit 2 of the air conditioner can operate according to each parameter set by the user-defined operating parameter curve in corresponding time after receiving the user-defined operating parameter curve set by the remote controller 1.

The remote controller transmits the set parameter data to the air conditioner after entering into the user-defined mode each time and the air conditioner starts to operate according to the user-defined mode.

The above-mentioned embodiments are only preferred embodiments of the present invention and do not limit the invention. It should be understood by those skilled in the art that the invention can be practiced with various modifications and variations. Any modification, equivalent replacement, improvement, etc. made according to the spirit and principle of the present invention shall be regarded as within the protection scope of the invention.

What is claimed is:

1. A method of controlling an air conditioning system comprising an air conditioner main unit and a remote controller to function in accordance to a user-defined curve, comprising a plurality of steps of:

setting the user-defined curve via a keypad of the remote controller;

storing data of the user-defined curve data into a memory chip of the remote controller;

transmitting in a coded format data of the user-defined curve from an infrared signal emission unit of the remote controller to an infrared signal receiving unit of the air conditioner main unit; and storing data of the user-defined curve in a random access memory of microcontroller unit of the air conditioner main unit, setting a plurality of preset operating parameters corresponding to a time period according to data of the user-defined curve stored in the random access memory and controlling the air conditioner main unit to operate based on the plurality of operating parameters; and wherein the user-defined curve is a user-defined sleep curve, wherein the remote controller has a time interval setting function, and wherein setting the user-defined sleep curve further comprises a plurality of steps of:

a) entering into a user-defined setting state;

b) setting one of a plurality of temperature values during one of a plurality of time intervals into the remote controller;

c) incrementing the one of the plurality of time intervals in step b while maintaining the one of the plurality of temperature values;

d) adjusting the one of the plurality of temperature values of step b to another one of the plurality of temperature values if a change of the temperature value of step b is needed;

e) confirming if there is no need to change the any of the one of the plurality of temperature values of step b; and f) repeating steps b, c, d and e until temperature setting for all of the plurality of intervals is completed, thus completing the setting of the user-defined sleep curve.

2. A method for controlling an air conditioning system comprising an air conditioning main unit and a remote controller to function in accordance to a user-defined curve, comprising a plurality of steps of:
setting a user-defined curve via a keypad on the remote controller;
storing data of the user-defined curve in a memory chip of the remote controller;
transmitting in a coded format of data of the user-defined curve via an infrared signal emission unit of the remote controller to an infrared signal receiving unit of the air conditioning main unit; and
storing data of the user-defined curve in a random access memory of a microcontroller unit of the air conditioning main unit;
setting by the microcontroller unit a plurality of preset operating parameters corresponding to time period in accordance to data of the user-defined curve in the random access memory and controlling the air conditioning main unit to operate based on the plurality of operating parameters; and
wherein the user-defined curve is a user-defined sleep curve, wherein the remote controller has a time interval setting function, and wherein setting the user-defined sleep curve further comprises a plurality of steps of:
a) entering into a user-defined setting state;
b) displaying on a display unit of the remote controller one of a plurality of temperature values corresponding to a sleep curve previously set in the first 1 hour of a plurality of 1 hour time intervals,
c) incrementing the plurality of 1 hour time intervals of step b while maintaining the one of the plurality of temperature values;
d) adjusting the one of the plurality of temperature values of step b to another one of the plurality of temperature values if a change of the temperature value of step b is needed;
e) confirming if there is no need to change any of the one of the plurality of temperature values of step b,
f) repeating steps b, c, d and e until temperature setting for all of the plurality of 1 hour time intervals is completed, thus completing the setting of the user-defined sleep curve.

3. A method according to claim 1 or 2, wherein the plurality of time intervals are constant time intervals preset in the remote controller.

4. A method according to claim 1 or 2, wherein the step of adjusting the set temperature is implemented by operating a "+" key and a "−" key on the remote controller.

5. A method according to claim 1 or 2, wherein the user-defined sleep curve setting state is terminated if no key is pressed in during the preset time or an On/Off key or a Mode key on the remote controller is pressed in the process of setting the user-defined sleep curve.

6. A method according to claim 1 or 2, wherein the user-defined sleep curve setting state is terminated and the sleep mode is changed if a "Sleep" key on the remote controller is pressed in the process of setting the sleep curve.

7. A method according to claim 1 or 2, wherein if the a "Set" key is pressed under the user-defined sleep mode, a master chip of the remote controller will recall data of the user-defined sleep curve from the memory chip and transmit the data to the display unit of the remote controller, the display unit will display the user-defined sleep curve, thus the user will be able to check on the user-defined sleep curve.

8. A method of controlling an air conditioning system comprising an air conditioning main unit and a remote controller to function in accordance to a user-defined curve, comprising a plurality of steps of:
setting a user-defined curve via the keypad on the remote controller;
storing data of the user-defined curve in a memory chip of the remote controller;
transmitting in a coded format data of the user-defined curve via an infrared signal emission unit of the remote controller to an infrared signal receiving unit of the air conditioning main unit; and
storing data of the user-defined curve in a random access memory of a microcontroller unit by the infrared signal receiving unit of the air conditioning main unit,
setting a plurality of preset operating parameters corresponding to a time period in accordance to the user-defined curve data in the random access memory and controlling the air conditioning main unit to function based on the plurality of preset operating parameters; and
wherein the user-defined curve is a user-defined time-temperature curve, wherein the remote controller has a time timing function, and wherein setting the user-defined time-temperature curve further comprises a plurality of steps of:
a) activating a user-defined curve setting state;
b) setting a starting time and an operating time period for the user-defined curve operating state;
c) setting a temperature corresponding to the operating time period to finish setting a temperature point; and
d) completing the setting of the user-defined time-temperature curve by repeatedly setting multiple temperature points and entering into the user-defined time-temperature curve operating mode.

9. A method according to claim 8, wherein the starting time can be any of 24 hours in a day.

10. A method according to claim 8, wherein the step of adjusting the set time is implemented by operating a "+" key and a "−" key on the remote controller in combination with a "Timing" key.

11. A method according to claim 8, wherein the user-defined time-temperature curve setting state is terminated if no key is pressed within a preset time or an On/Off key or a Mode key on the remote controller is pressed in the process of setting the user-defined curve.

12. A method according to claim 8, wherein if a "Set" key is pressed under the user-defined time-temperature curve operating mode, a master chip of the remote controller will recall the user-defined time-temperature curve data from a memory chip and transmit the data to a display unit of the remote controller, the display unit will display the user-defined time-temperature curve, thus the user will be able to check and modify the user-defined time-temperature curve.

13. A method according to claim 8, wherein the user-defined curve is a user-defined mode curve, the remote controller has a master chip with a clock counting function, and setting the user-defined mode curve further comprises a plurality of steps of:
a13) entering into the user-defined setting state to set the starting time and the operating time period of the user-defined mode; and
b13) setting the plurality of operating functional parameters of the air conditioner corresponds to each operating time period, said plurality of functional parameters comprising an On/Off Mode, Temperature and/or Wind Velocity.

14. A method according to claim 13, further comprising repeating the steps a13 and b13 until setting for 24 hours is completed, thus completing automatic operating state setting of the air conditioner.

15. A method according to claim 13, wherein setting of the starting time and the operating time period of the user-defined mode is implemented by operating a "+" key and a "−" key in combination with a "Timing" key.

16. The method of either claim 1, 2 or 8, wherein an air conditioner is controlled according to a user-defined curve, comprising an air conditioning main unit and a remote controller.

* * * * *